US007079374B1

(12) United States Patent
Kim et al.

(10) Patent No.: US 7,079,374 B1
(45) Date of Patent: Jul. 18, 2006

(54) GLASS FRIT FOR DIELECTRICS, DIELECTRIC CERAMIC COMPOSITION, MULTILAYER CERAMIC CAPACITOR, AND METHOD FOR MANUFACTURING THE SAME

(75) Inventors: Kyeong Ho Kim, Kyungki-do (KR); Dong Sook Sinn, Seoul (KR); Tae Young Kim, Kyungki-do (KR); Hyo Soon Shin, Kyungki-do (KR); Soon Mo Song, Kyungki-do (KR); Ic Seob Kim, Kyungki-do (KR)

(73) Assignee: Samsung-Electro Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 11/169,570

(22) Filed: Jun. 30, 2005

(30) Foreign Application Priority Data

Apr. 11, 2005 (KR) ...................... 10-2005-0030086

(51) Int. Cl.
*H01G 4/06* (2006.01)
*H01G 4/20* (2006.01)
*C04B 35/46* (2006.01)
*C04B 35/48* (2006.01)

(52) U.S. Cl. ............................... 361/321.4; 361/321.5; 361/312; 501/136; 501/135

(58) Field of Classification Search .. 361/321.1–321.5, 361/320, 312, 311; 501/134–136, 154, 21
See application file for complete search history.

(56) References Cited

U.S. PATENT DOCUMENTS

| 2002/0010066 A1* | 1/2002 | Nakashima et al. ........... 501/69 |
| 2003/0114293 A1* | 6/2003 | Mizuno et al. ................ 501/80 |
| 2003/0119653 A1* | 6/2003 | Tanaka et al. ................. 501/79 |
| 2006/0025298 A1* | 2/2006 | Emlemdi ...................... 501/26 |

FOREIGN PATENT DOCUMENTS

| JP | 11-283860 | 10/1999 |
| JP | 2002-356371 | 12/2002 |
| KR | 1020010048867 | 6/2001 |

* cited by examiner

*Primary Examiner*—Eric W. Thomas
(74) *Attorney, Agent, or Firm*—Lowe, Hauptman & Berner, LLP (57) ABSTRACT

A glass frit for dielectrics, a dielectric ceramic composition, a multilayer ceramic capacitor, and a method for manufacturing the same are disclosed. The glass frit has a composition represented by the formula $aSiO_2\text{-}bB_2O_3\text{-}cLi_2O\text{-}dK_2O\text{-}eCaO\text{-}fAl_2O_3\text{-}gTiO_2\text{-}hZrO_2$, wherein the ratio of components satisfies the conditions of $20 \leq a \leq 35$, $20 \leq b \leq 35$, $20 \leq c \leq 30$, $3 \leq d \leq 5$, $2 \leq e \leq 12$, $2 \leq f \leq 10$, $1 \leq g \leq 12$ and $1 \leq h \leq 7$ in terms of mol % where $a+b+c+d+e+f+g+h=100$. The dielectric ceramic composition comprises 100 parts by weight of $(Ca_{1-x}R_x)(Zr_{1-y}Ti_y)O_3$, 0.5~2.5 parts by weight of the glass frit, and 1.0~5.0 parts by weight of a Mn compound. Additionally, the multilayer ceramic capacitor, and the method for manufacturing the same also use the glass frit having the above composition. The ratio of tetracoordinate boron to tricoordinate boron is increased in a lithium borosilicate glass, thereby enhancing structural property, and the components of $Al_2O_3$, $TiO_2$ and $ZrO_2$ enhance acid resistance.

34 Claims, 8 Drawing Sheets

GLASS FRIT FOR DIELECTRICS, DIELECTRIC CERAMIC COMPOSITION, MULTILAYER CERAMIC CAPACITOR, AND METHOD FOR MANUFACTURING THE SAME

RELATED APPLICATION

The present invention is based on, and claims priority from, Korean Application Number 2005-30086, filed Apr. 11, 2005, the disclosure of which is incorporated by reference herein in its entirety.

BACKGROUND OF THE INVENTION

1. Field of the Invention

The present invention relates to a glass frit for dielectrics, a dielectric ceramic composition, a multilayer ceramic capacitor, and a method for manufacturing the same. More particularly, the present invention relates to a glass frit for dielectrics, which has a higher ratio of tetracoordinate boron in a lithium borosilicate glass, thereby preventing gelation of dielectric slurries while minimizing or preventing agglomeration of the glass on the surface of a dielectric layer of a multilayer ceramic capacitor.

2. Description of the Related Art

Recently, as a result of an increasing trend toward miniaturization and weight reduction of electronic devices, use of multilayer ceramic capacitors has been increased. The multilayer ceramic capacitors are generally used for mobile communication devices, such as mobile phones, notebook computers, PDAs, and the like.

The multilayer ceramic capacitor generally comprises a plurality of dielectric layers, internal electrodes formed between the dielectric layers, and external electrodes formed at opposite ends of a stacked body so as to be electrically connected to the internal electrodes. The internal electrodes of the ceramic capacitor are formed of inexpensive Ni, Cu, or alloys thereof instead of high priced Pd. In particular, it has been attempted to employ Cu exhibiting less variation in resistance and capacitance for the internal electrodes of a multilayer ceramic capacitor for temperature compensation. However, since Cu has a lower melting point, it has been needed to develop a new dielectric ceramic composition, which enables sintering at a low temperature of 1,000° C. or less.

Technology of the multilayer ceramic capacitor for temperature compensation enabling low temperature sintering is disclosed in Japanese Patent Laid-open Publication Nos. 1999-283860 and 2002-356371, and Korean Patent Laid-open Publication No. 2001-0048867. The technology of the disclosures provides a dielectric ceramic composition comprising a glass frit in order to employ Cu for the internal electrodes.

First, Japanese Patent Laid-open Publication No. 1999-283860 discloses a multilayer ceramic capacitor comprising dielectric ceramic layers, in which the dielectric ceramic layers comprise 100 parts by weight of $Ca(Zr_{1-y}Ti_y)O_3$ as a main component, 0.5~2.5 parts by weight of $aSiO_2$-$bB_2O_3$-$eCaO$ based glass ($25 \leq a \leq 45$, $45 \leq b \leq 65$, $5 \leq e \leq 20$), and 1.0~3.0 parts by weight of $MnCO_3$ as a Mn compound.

Japanese Patent Laid-open Publication No. 2002-356371 discloses a multilayer ceramic capacitor comprising dielectric ceramic layers, in which the dielectric ceramic layers comprise 100 parts by weight of $(Ca_{1-x}Mg_x)(Zr_{1-y}Ti_y)O_3$ as a main component, 0.5~2.5 parts by weight of $aSiO_2$-$bB_2O_3$-$cLi_2O$-$eCaO$-$iBaO$ based glass ($0.1 \leq a \leq 0.7$, $0.15 \leq b \leq 0.89$, $0.01 \leq c \leq 0.5$, $0 \leq d \leq 0.4$, $0 \leq i \leq 0.4$), and $MnO_2$.

Korean Patent Laid-open Publication No. 2001-0048867 discloses a multilayer ceramic capacitor comprising dielectric ceramic layers, in which the dielectric ceramic layers comprise 1~5 parts by weight of $MnO_2$, 0.5~10 parts by weight of $aSiO_2$-$bB_2O_3$-$cLi_2O$-$fAl_2O_3$-$iRO$-$jRO_2$ based glass ($10 \leq a \leq 50$, $10 \leq b \leq 60$, $10 \leq c \leq 50$, $0 < f \leq 10$, $0 < i+j \leq 25$), and the balance of $(Ca_{1-x}Sr_x)(Zr_{1-y}Ti_y)O_3$ ($0 \leq x \leq 0.1$, $0 \leq y \leq 0.1$). In the glass, R represents one element selected from Ba, Ca, Sr, Mn, Mg, Zn, Ti, Pb and Ce.

With the conventional technology of the disclosures, the glass frit is added to the dielectric ceramic composition, thereby realizing low temperature sintering. However, when combining the glass frit with ceramic slurries, gelation of the slurries occurs long after mixing of the slurries, thereby making it difficult to apply the technology to mass production of the multilayer ceramic capacitors. Moreover, the conventional technology of the disclosures has a problem in that, due to variation in composition caused by elution or volatilization of some components of the glass from the ceramic slurries, fluidity of the glass is lowered, causing agglomeration of the glass on the surface of a ceramic sintered body. Additionally, the multilayer ceramic capacitor manufactured by the conventional technology of the disclosures exhibits poor acid resistance.

SUMMARY OF THE INVENTION

The present invention has been made to solve the above problems, and it is an object of the present invention to provide a glass frit for dielectrics, which can prevent gelation of dielectric slurry, and prevent agglomeration of a glass during a process of sintering the dielectrics while enhancing acid resistance.

It is another object of the present invention to provide a dielectric ceramic composition comprising the glass frit, a multilayer ceramic capacitor manufactured using the same, and a method for manufacturing the same.

In accordance with one aspect of the present invention, the above and other objects can be accomplished by the provision of a dielectric glass frit for dielectrics, having: a composition represented by the formula $aSiO_2$-$bB_2O_3$-$cLi_2O$-$dK_2O$-$eCaO$-$fAl_2O_3$-$gTiO_2$-$hZrO_2$, wherein the ratio of components satisfies the conditions of $20 \leq a \leq 35$, $20 \leq b \leq 35$, $20 \leq c \leq 30$, $3 \leq d \leq 5$, $2 \leq e \leq 12$, $2 \leq f \leq 10$, $1 \leq g \leq 12$ and $1 \leq h \leq 7$ in terms of mol % where $a+b+c+d+e+f+g+h=100$.

Preferably, the content of $SiO_2$ satisfies the condition of $20 \leq a \leq 25$, and the ratio of $B_2O_3$ to $Li_2O$ satisfies the condition of $b/c > 0.9$. More preferably, the ratio of $B_2O_3$ to $Li_2O$ satisfies the condition of $0.93 \leq b/c \leq 1.66$.

Preferably, the content of $SiO_2$ satisfies the condition of $25 < a \leq 35$, and the ratio of $B_2O_3$ to $Li_2O$ satisfies the condition of $b/c < 0.9$. More preferably, the ratio of $B_2O_3$ to $Li_2O$ satisfies the condition of $0.86 \leq b/c \leq 0.88$.

Most preferably, the ratio of tetracoordinate boron (BO4) to tricoordinate boron (BO3) is between 3.235 and 3.437.

In accordance with another aspect of the present invention, a dielectric ceramic composition is provided, comprising: 100 parts by weight of $(Ca_{1-x}R_x)(Zr_{1-y}Ti_y)O_3$ ($0 \leq x \leq 0.1$, $0 \leq y \leq 0.1$); 0.5~2.5 parts by weight of glass having a composition represented by the formula $aSiO_2$-$bB_2O_3$-$cLi_2O$-$dK_2O$-$eCaO$-$fAl_2O_3$-$gTiO_2$-$hZrO_2$; and 1.0~5.0 parts by weight of a Mn compound, wherein R represents one element selected from Mg and Sr, and the ratio of components of the glass frit satisfies the conditions of 20≦a≦35, 20≦b≦35, 20≦c≦30, 3≦d≦5, 2≦e≦12, 2≦f≦10, 1≦g≦12 and 1≦h≦7 in terms of mol % where a+b+c+d+e+f+g+h=100.

Preferably, the content of $SiO_2$ satisfies the condition of 20≦a≦25, and the ratio of $B_2O_3$ to $Li_2O$ satisfies the condition of b/c>0.9. More preferably, the ratio of $B_2O_3$ and $Li_2O$ satisfies the condition of 0.93≦b/c≦1.66.

Preferably, the content of $SiO_2$ satisfies the condition of 25<a≦35, and the ratio of $B_2O_3$ to $Li_2O$ satisfies the condition of b/c<0.9. More preferably, the ratio of $B_2O_3$ and $cLi_2O$ satisfies the condition of 0.86≦b/c≦0.88.

Most preferably, the ratio of tetracoordinate boron (BO4) to tricoordinate boron (BO3) is between 3.235 and 3.437.

Preferably, the dielectric ceramic composition further comprises 0.2~1.0 part by weight of at least one filler selected from the group consisting of $ZrSiO_4$, $SiO_2$, $ZrO_2$, and $Al_2O_3$.

In accordance with another aspect of the invention, a multilayer ceramic capacitor is provided, comprising: a plurality of dielectric ceramic layers; Cu internal electrodes formed between the plurality of dielectric ceramic layers; and Cu external electrodes formed at opposite ends of a stacked body so as to be electrically connected to the internal electrodes, each of the dielectric ceramic layers comprising 100 parts by weight of $(Ca_{1-x}R_x)(Zr_{1-y}Ti_y)O_3$ (where 0≦x≦0.1, 0≦y≦0.1), 0.5~2.5 parts by weight of glass having a composition represented by the formula $aSiO_2$-$bB_2O_3$-$cLi_2O$-$dK_2O$-$eCaO$-$fAl_2O_3$-$gTiO_2$-$hZrO_2$, and 1.0~5.0 parts by weight of a Mn compound, wherein R represents one element selected from Mg and Sr, and the ratio of components of the glass frit satisfies the conditions of 20≦a≦35, 20≦b≦35, 20≦c≦30, 3≦d≦5, 2≦e≦12, 2≦f≦10, 1≦g≦12 and 1≦h≦7 in terms of mol % where a+b+c+d+e+f+g+h=100.

Preferably, the content of $SiO_2$ satisfies the condition of 20≦a≦25, and the ratio of $B_2O_3$ to $Li_2O$ satisfies the condition of b/c>0.9. More preferably, the ratio of $B_2O_3$ to $Li_2O$ satisfies the condition of 0.93≦b/c≦1.66.

Preferably, the content of $SiO_2$ satisfies the condition of 25<a≦35, and the ratio of $B_2O_3$ to $Li_2O$ satisfies the condition of b/c<0.9. More preferably, the ratio of $B_2O_3$ to $Li_2O$ satisfies the condition of 0.86≦b/c≦0.88.

Most preferably, the ratio of tetracoordinate boron (BO4) to tricoordinate boron (BO3) is between 3.235 and 3.437.

Preferably, the dielectric ceramic composition further comprises 0.2~1.0 part by weight of at least one filler selected from the group consisting of $ZrSiO_4$, $SiO_2$, $ZrO_2$, and $Al_2O_3$.

According to the present invention, agglomeration of the glass on the surface of the dielectric layers of the multilayer ceramic capacitor is minimized or prevented.

In accordance with yet another aspect of the present invention, a method for manufacturing a multilayer ceramic capacitor is provided, comprising the steps of: forming Cu internal electrodes on surfaces of dielectric sheets formed of the dielectric ceramic composition of the invention; forming a stacked body by laminating, compressing and cutting the dielectric sheets having the Cu internal electrodes formed therein; applying paste for Cu external electrodes on opposite ends of the stacked body such that the Cu external electrodes are electrically connected to the Cu internal electrodes; and performing simultaneous sintering of the stacked body having the Cu external electrodes formed thereon.

Herein, the term "simultaneous sintering" means that plasticizing and sintering of the stacked body, and sintering of the external electrodes are performed simultaneously.

That is, simultaneous sintering means that the dielectric layers, the internal electrodes, and the external electrodes are simultaneously processed under the same conditions as those of plasticizing and sintering of the conventional stacked body.

Preferably, the paste of the Cu external electrodes comprises 40~70 wt % of Cu metal, 5~20 wt % of ceramic powders of $(Ca_{1-x}R_x)(Zr_{1-y}Ti_y)O_3$ (0≦x≦0.1 and 0≦y≦0.1) where R represents one element selected from Mg and Sr; 1.6~5.6 wt % of a binder; and the balance of a solvent. Preferably, the binder is an ethyl cellulose-based binder. Preferably, sintering is performed at a temperature of 900~970° C.

BRIEF DESCRIPTION OF THE DRAWINGS

The above and other objects, features and other advantages of the present invention will be more clearly understood from the following detailed description taken in conjunction with the accompanying drawing:

FIGS. 7*a* to 7*c* are micrographs of microstructures of sintered samples, in which FIG. 7*a* shows the microstructure of the sample comprising a conventional glass frit, FIG. 7*b* shows the microstructure of the sample comprising a glass frit of A11, and FIG. 7*c* shows the microstructure of the sample comprising the glass frit of A11 and a filler.

DESCRIPTION OF THE PREFERRED EMBODIMENTS

Preferred embodiments will now be described in detail with reference to the accompanying drawings.

The inventors have paid attention to the fact that gelation of dielectric slurries is caused by bonding between $B^{3+}$ eluted from a glass and OH of a binder, and found the mechanism for suppressing elution of $B^{3+}$ from the glass, thereby completing the present invention.

Due to the weak binding force of boron, lithium borosilicate glass suffers from elution of boron ions upon mixing of slurries or volatilization upon increase of temperature. As $B^{3+}$ ions are eluted from the glass, fluidity of the slurry is relatively lowered, and thus movement of the slurry is delayed, thereby causing agglomeration of the glass.

Accordingly, it is important to reinforce the binding force of boron in the lithium borosilicate glass.

Figure 1:
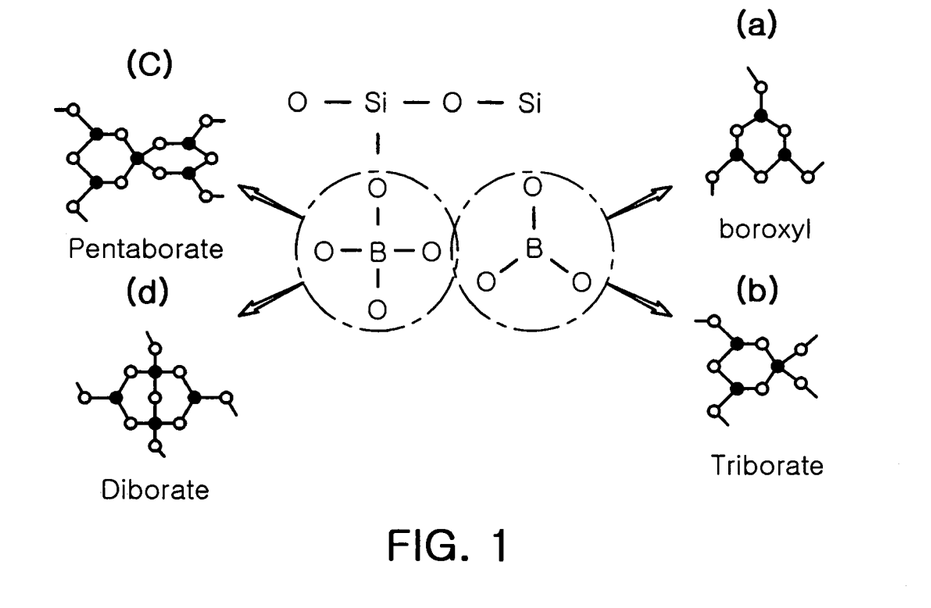
FIG. 1 is a diagram of bonding structures of boron and oxygen in a lithium borosilicate glass.

FIG. 1 is diagrams of bonding structures of boron and oxygen in the lithium borosilicate glass. In FIG. 1, (*a*) and (*b*) show a basic structure of tricoordinate boron in a boroxyl group and a triborate group. In FIG. 1, (*c*) and (*d*) show a basic structure of tetracoordinate boron of a pentaborate group and a diborate group.

In lithium borosilicate, such tricoordinate boron and tetracoordinate boron are substantially mixed with each other. The inventors have found that, as an amount of tetracoordinate structure is increased depending on contents of $SiO_2$, $B_2O_3$, and $Li_2O$ in the lithium borosilicate glass, the structural properties of the glass is reinforced, thereby suppressing gelation of the dielectric slurry and agglomeration of the glass. In particular, the inventors have found that the ratio of tetracoordinate boron to tricoordinate boron can be remarkably increased according to a ratio of $B_2O_3$ and $Li_2O$ associated with the content of $SiO_2$.

Moreover, for the purpose of low temperature sintering, a large amount of $B_2O_3$ and $Li_2O$ is added to the lithium borosilicate glass, so that the content of $SiO_2$ is reduced, thereby lowering acid resistance of the glass. Thus, in order to compensate for the lowered acid resistance of the glass, it is also important to enhance acid resistance of the glass by adding $Al_2O_3$, $ZrO_2$ and $TiO_2$.

In view of this, a glass frit of the invention has a composition represented by the formula $aSiO_2$-$bB_2O_3$-$cLi_2O$-$dK_2O$-$eCaO$-$fAl_2O_3$-$gTiO_2$-$hZrO_2$, wherein the ratio of components satisfies the conditions of $20 \leq a \leq 35$, $20 \leq b \leq 35$, $20 \leq c \leq 30$, $3 \leq d \leq 5$, $2 \leq e \leq 12$, $2 \leq f \leq 10$, $1 \leq g \leq 12$ and $1 \leq h \leq 7$ in terms of mol % where $a+b+c+d+e+f+g+h=100$. The components of the glass frit will be described in detail as follows.

Content of silicon dioxide $SiO_2$ is preferably in the range of 20~35 mol %.

Silicon dioxide has a structure in which each silicon atom is surrounded by four oxygen atoms while being bonded to four other silicon atoms via the four oxygen atoms. Silicon dioxide is a glass network-former, and acts as the largest factor determining a softening temperature and acid resistance of a glass. When the content of silicon dioxide is less than 20 mol %, diffusivity from a matrix is deteriorated, thereby lowering sinterability. When the content of silicon dioxide is more than 35 mol %, the softening temperature of the glass is increased, and thus the glass becomes inappropriate as a sintering additive for low temperature sintering.

Content of boron oxide ($B_2O_3$) is preferably in the range of 20~35 mol %.

Boron oxide can substitute for silicon dioxide as a glass network-former, and acts to reduce temperature properties, such as a glass transition temperature, a softening temperature, and the like. For this purpose, boron oxide of 20 mol % or more is preferably added to the glass frit. Among components of the glass frit, an added amount of boron oxide up to 35 mol % will act to lower the softening temperature of the glass without significantly influencing chemical endurance and mechanical strength. However, an added amount of boron oxide above 35 mol % will result in reduction of chemical endurance and mechanical strength while weakening the structure of the glass.

Content of lithium oxide ($Li_2O$) is preferably in the range of 20~30 mol %.

Lithium oxide is a glass-network modifier, and acts as a flux to disconnect the glass network of silicon oxide or boron oxide and to increase batch solubility. Thus, lithium oxide acts to lower the softening point and the glass transition temperature of the glass. When the content of lithium oxide is less than 20 mol %, the glass transition temperature is significantly increased, and when the content of lithium oxide exceeds 30 mol %, the softening temperature is significantly lowered together with acid resistance.

Content of potassium oxide ($K_2O$) is preferably in the range of 3~5 mol %.

Potassium oxide is also a glass-network modifier, and acts as a flux to disconnect the glass network of silicon oxide or boron oxide and to increase batch solubility, while acting to lower the softening point and the glass transition temperature of the glass. In particular, when potassium oxide is added to the glass together with other alkali oxides, such as lithium oxide, structurally complementary effects can be achieved, so that potassium oxide acts to partially reinforce the structure of the glass. A content of potassium oxide in the range of 3~5 mol % provides an appropriate softening temperature while exhibiting appropriate structure complementation effect with lithium oxide.

Content of calcium oxide (CaO) is preferably in the range of 2~12 mol %.

Calcium oxide is a glass-network modifier, and acts to reinforce the glass structure weakened by an alkali metal. Calcium oxide is an alkali earth metal oxide, and also influences viscosity of the glass and enhances chemical endurance. However, calcium oxide has a disadvantage of generating a short glass (the term "short glass" means a glass in which change in viscosity is slow). 2 mol % or more of calcium oxide is added to the glass for the purpose of reinforcing the structure. However, when the content of calcium oxide is above 12 mol %, the softening temperature of the glass is increased.

Content of aluminum oxide ($Al_2O_3$) is preferably in the range of 2~10 mol %.

Aluminum oxide acts as an interstitial oxide in the structure of the glass, and generates a long glass (the term "long glass" means a glass in which change in viscosity is fast). In other words, it widens the operating temperature range, reinforces the structure, increases chemical endurance, and prevents crystallization of the glass. When the content of aluminum oxide is below 2 mol %, there is no structure reinforcing effect, and when the content of aluminum oxide is above 10 mol %, the softening temperature of the glass is increased.

Content of titanium oxide ($TiO_2$) is preferably in the range of 1~12 mol %.

Titanium oxide acts as an interstitial oxide in the structure of the glass, and generates a long glass. In other words, it widens the operating temperature range, reinforces the structure, increases chemical endurance, and prevents crystallization of the glass. When the content of titanium oxide is below 1 mol %, no structure reinforcing effects are exhibited, and when the content of titanium oxide is above 12 mol %, the softening temperature of the glass is increased.

Content of zirconium oxide ($ZrO_2$) is preferably in the range of 1~7 mol %.

Zirconium oxide acts as an interstitial oxide in the structure of the glass, and generates a long glass. In other words, it widens the operating temperature range, reinforces the structure, increases chemical endurance, and prevents crystallization of the glass. When the content of zirconium oxide is below 1 mol %, no structure reinforcing effects are exhibited, and when the content of zirconium oxide is above 7 mol %, the softening temperature of the glass is increased.

According to the invention, an optimum composition of the glass frit for preventing the gelation of the slurry and the agglomeration of the glass can be achieved by appropriately controlling the ratio of $B_2O_3/Li_2O$ depending on the content of $SiO_2$.

When the content of $SiO_2$ is in the range of $20 \leq SiO_2 \leq 25$, the ratio of $B_2O_3$ to $Li_2O$ satisfies the condition of $B_2O_3/Li_2O > 0.9$, and more preferably, the condition of $0.93 \leq B_2O_3/Li_2O \leq 1.66$.

When the content of $SiO_2$ is in the range of $25 < SiO_2 \leq 35$, the ratio of $B_2O_3$ to $Li_2O$ satisfies the condition of $B_2O_3/Li_2O < 0.9$, and more preferably, the condition of $0.86 \leq B_2O_3/Li_2O \leq 0.88$.

When the ratio of tetracoordinate boron (BO4) to tricoordinate boron (BO3) is in the range of 3.235~3.437 in the lithium borosilicate glass frit of the invention, the agglomeration of the glass can be completely prevented from occurring. In the glass frit of the invention satisfying the above conditions, when the content of $SiO_2$ is in the range of $20 \leq SiO_2 \leq 25$, the ratio of $B_2O_3$ to $Li_2O$ satisfies the condition of $0.93 \leq B_2O_3/Li_2O \leq 1.66$. The ratio of tetracoordinate boron to tricoordinate boron is measured by use of B Solid-NMR (Solid/Micro-Imaging High Resolution NMR, Bruker, ADVANCER 400 WB, DSX-400, Germany).

According to the invention, the glass frit preferably has a size of 0.8~1.0 μm.

A dielectric ceramic composition of the invention will be described as follows.

The glass frit of the invention may be applied to the dielectric ceramic composition, which can prevent gelation of dielectric slurry and agglomeration of glass while enhancing acid resistance. The most preferred dielectric ceramic composition having the glass frit of the invention comprises: 100 parts by weight of $(Ca_{1-x}R_x)(Zr_{1-y}Ti_y)O_3$ ($0 \leq x \leq 0.1$ and $0 \leq y \leq 0.1$); 0.5~2.5 parts by weight of glass frit having a composition represented by the formula $aSiO_2$-$bB_2O_3$-$cLi_2O$-$dK_2O$-$eCaO$-$fAl_2O_3$-$gTiO_2$-$hZrO_2$; and 1.0~5.0 parts by weight of a Mn compound, wherein R represents one element selected from Mg and Sr, and the ratio of components of the glass frit satisfies the conditions of $20 \leq a \leq 35$, $20 \leq b \leq 35$, $20 \leq c \leq 30$, $3 \leq d \leq 5$, $2 \leq e \leq 12$, $2 \leq f \leq 10$, $1 \leq g \leq 12$ and $1 \leq h \leq 7$ in terms of mol % where $a+b+c+d+e+f+g+h=100$.

The main component of the dielectric ceramic composition is ceramic powders of $(Ca_{1-x}R_x)(Zr_{1-y}Ti_y)O_3$ ($0 \leq x \leq 0.1$ and $0 \leq y \leq 0.1$) where R represents one element selected from Mg and Sr. The main component of the dielectric ceramic composition includes $Ca(Zr_{1-y}Ti_y)O_3$, $(Ca_{1-x}Sr_x)(Zr_{1-y}Ti_y)O_3$, $(Ca_{1-x}Mg_x)(Zr_{1-y}Ti_y)O_3$, and the like, and most preferably includes $Ca(Zr_{1-y}Ti_y)O_3$.

Preferably, as for a subcomponent of the dielectric ceramic composition of the invention, a Mn compound acting as a sintering accelerator is added thereto. The Mn compound includes $MnO_2$, $MnCO_3$, and the like. Content of Mn compound is in the range of 1.0~5.0 parts by weight with respect to 100 parts by weight of the main component. When the content of Mn compound is less than 1 part by weight, the Mn compound does not properly act as the sintering accelerator, causing non-sintering at a desired sintering temperature. However, a content of Mn compound above 5 parts by weight is undesirable, since a grain size will be increased.

The dielectric ceramic composition of the invention employs the glass frit of the invention as described above. When the content of $SiO_2$ is in the range of $20 \leq SiO_2 \leq 25$, the ratio of $B_2O_3$ to $Li_2O$ satisfies the condition of $B_2O_3/Li_2O > 0.9$, and more preferably, $0.93 \leq B_2O_3/Li_2O \leq 1.66$. When the content of $SiO_2$ is in the range of $25 < SiO_2 \leq 35$, the ratio of $B_2O_3$ to $Li_2O$ satisfies the condition of $B_2O_3/Li_2O < 0.9$, and more preferably, $0.86 \leq B_2O_3/Li_2O \leq 0.88$.

Preferably, the ratio of tetracoordinate boron (BO4) to tricoordinate boron (BO3) is in the range of 3.235~3.437 in the lithium borosilicate glass frit of the invention.

Additionally, the dielectric ceramic composition of the invention preferably further comprises 0.2~1.0 part by weight of at least one filler selected from the group consisting of $ZrSiO_4$, $SiO_2$, $ZrO_2$, and $Al_2O_3$. The filler acts to ensure densification of the microstructure by enhancing wettability between the main component powder and the glass frit. In order to achieve the effect, the filler content must be 0.2 parts by weight or more, and when the filler content is above 1.0 part by weight fluidity of the glass is lowered.

A multilayer ceramic capacitor of the invention comprises: a plurality of dielectric ceramic layers; Cu internal electrodes formed between the plurality of dielectric ceramic layers; and Cu external electrodes formed at opposite ends of a stacked body so as to be electrically connected to the internal electrodes, each of the dielectric ceramic layers comprising 100 parts by weight of $(Ca_{1-x}Sr_x)(Zr_{1-y}Ti_y)O_3$ ($0 \leq x \leq 0.1$ and $0 \leq y \leq 0.1$), 0.5~2.5 parts by weight of glass having a composition represented by the formula $aSiO_2$-$bB_2O_3$-$cLi_2O$-$dK_2O$-$eCaO$-$fAl_2O_3$-$gTiO_2$-$hZrO_2$, and 1.0~5.0 parts by weight of a Mn compound, wherein R represents one element selected from Mg and Sr, and the ratio of components of the glass frit satisfies the conditions of $20 \leq a \leq 35$, $20 \leq b \leq 35$, $20 \leq c \leq 30$, $3 \leq d \leq 5$, $2 \leq e \leq 12$, $2 \leq f \leq 10$, $1 \leq g \leq 12$ and $1 \leq h \leq 7$ in terms of mol % where $a+b+c+d+e+f+g+h=100$.

The dielectric ceramic composition of the invention employs the glass frit of the invention as described above. When the content of $SiO_2$ of the glass frit is in the range of $20 \leq SiO_2 \leq 25$, the ratio of $B_2O_3$ to $Li_2O$ satisfies the condition of $B_2O_3/Li_2O > 0.9$, and more preferably, $0.93 \leq B_2O_3/Li_2O \leq 1.66$. When the content of $SiO_2$ is in the range of $25 < SiO_2 \leq 35$, the ratio of $B_2O_3$ to $Li_2O$ satisfies the condition of $B_2O_3/Li_2O < 0.9$, and more preferably, $0.86 \leq B_2O_3/Li_2O \leq 0.88$.

Preferably, the ratio of tetracoordinate boron (BO4) to tricoordinate boron (BO3) is in the range of 3.235~3.437 in the lithium borosilicate glass frit of the invention.

Additionally, the multilayer ceramic capacitor of the invention preferably further comprises 0.2~1.0 part by weight of at least one filler selected from the group consisting of $ZrSiO_4$, $SiO_2$, $ZrO_2$, and $Al_2O_3$.

According to the invention, the agglomeration of the glass on the surface of the dielectric layer of the multilayer ceramic capacitor is minimized to 3 μm or less, or completely prevented.

A most preferred example of a method for manufacturing the multilayer ceramic capacitor according to the invention will now be descried.

First, powders of the main component, powders of the glass frit, and powders of the subcomponent additive are prepared. The main component is preferably $(Ca_{1-x}R_x)(Zr_{1-y}Ti_y)O_3$. Here, preferably, R represents one element selected from Mg and Sr, and x and y satisfy the condition of $0 \leq x \leq 0.1$ and $0 \leq y \leq 0.1$.

The glass frit preferably has a composition represented by the formula $aSiO_2$-$bB_2O_3$-$cLi_2O$-$dK_2O$-$eCaO$-$fAl_2O_3$-$gTiO_2$-$hZrO_2$. In the glass frit of the invention, when the content of $SiO_2$ in the glass frit is in the range of $20 \leq SiO_2 \leq 25$, and the ratio of $B_2O_3$ to $Li_2O$ satisfies the condition of $B_2O_3/Li_2O > 0.9$, and more preferably, $0.93 \leq B_2O_3/Li_2O \leq 1.66$. When the content of $SiO_2$ is in the range of $25 < SiO_2 \leq 35$, the ratio of $B_2O_3$ to $Li_2O$ satisfies the condition of $B_2O_3/Li_2O < 0.9$, and more preferably, $0.86 \leq B_2O_3/Li_2O \leq 0.88$. Preferably, the ratio of tetracoordinate boron (BO4) to tricoordinate boron (BO3) is in the range of 3.235~3.437 in the lithium borosilicate glass frit of the invention.

As for the subcomponent, a Mn compound is preferred, and preferred compounds include, for example, $MnO_2$, $MnCO_3$, and the like.

The prepared powders, in which the mixing ratio of the powders is relative to 100 parts by weight of main component, 0.5~2.5 parts by weight of glass frit, and 1~5 parts by weight of Mn compound, are mixed.

The prepared dielectric powders become dielectric slurry during a batch process.

The dielectric slurry is a mixture of the dielectric powders, an organic binder, and a solvent. The organic binder may be selected from various binders, such as PVB, an acryl-based resin. The dielectric slurry may additionally include a dispersing agent, a plasticizer, and the like. It should be noted that the present invention is not limited to these.

Then, dielectric sheets are produced using the dielectric slurry.

With internal electrodes printed on the dielectric sheets, the dielectric sheets are stacked, and then compressed. The compressed dielectric sheets are cut into a predetermined shape, thereby forming a stacked body. The internal electrodes are constructed of Ni, Cu or an alloy thereof, and most preferably, of Cu or a Cu alloy.

The dielectric sheets are preferably compressed at 500~1,300 kgf/cm². It is possible to grind the stacked body constructed as described above into a round shape.

Next, as for a general process, after sequentially plasticizing and sintering the stacked body, external electrodes are applied to the stacked body, and are then sintered together with the stacked body. Although the invention can also employ such a process, it is desirable that, with the external electrodes applied to the stacked body which is not sintered, the external electrodes and the stacked body be simultaneously sintered. Simultaneous sintering is disclosed in detail in Korean Patent Laid-open Publication No. 2003-0037351. Simultaneous sintering is preferable in that it simplifies the manufacturing process while enhancing bonding of the external electrodes.

Paste for the external electrodes comprises a conductive metal, a binder, and a solvent. Additionally, although the glass frit can be provided as the paste of the external electrodes, when the stacked body and the external electrodes are simultaneously sintered according to the invention, the paste preferably comprises a ceramic inhibitor (sintering inhibitor), which will be described below, instead of the glass frit (herein, the term "ceramic inhibitor" or "sintering inhibitor" means a material consisting of the component commonly contained in the dielectric composition).

The conductive metal comprises Ni, Cu or an alloy thereof, and most preferably, of Cu or a Cu alloy. When Cu is used as the conductive metal, granules or flakes of Cu may be used independently or concurrently. However, preferably, mixtures of granules and flakes of Cu are used as the conductive metal.

As for the binder, an acryl-based resin is mainly used. Since an acryl-based resin has a large viscosity ratio according to variation in sheer stress, a coated thickness of the external electrodes is about 40~50 μm after drying. When the external electrodes are sintered, a post-sintering density is lowered, so that, when the external electrodes are thinly coated on the stacked body, the properties of the capacitor are deteriorated due to infiltration of a plating solution during a plating process. Thus, the external electrodes must be thickly coated to the stacked body, and the acryl-based binder is appropriate for this requirement. However, when the coated thickness of the external electrodes is large, there is a high possibility of delamination between the external electrodes and the dielectrics during a plasticizing process.

When simultaneous sintering is performed according to the preferred embodiment of the invention, a sintering time is longer than the case of sintering only the external electrodes after sintering the stacked body, and thus the post-sintering density is increased. Accordingly, even if a thickness of the external electrodes is about 20~30 μm, there is less possibility of infiltration of the plating solution during the plating process.

Since the an acryl-based resin binder has a large viscosity ratio, it is difficult to apply it to a thickness of about 20~30 μm. Accordingly, preferably, a cellulose-based binder having a lower viscosity ratio according to variation in sheer stress is used as the binder of the invention. The cellulose-based binder allows the external electrodes to be uniformly applied to the dielectric sheets.

A most preferable paste of the external electrodes comprises 40~70 wt % of Cu, 5~20 wt % of sintering inhibitor, and the balance of solvent, and this composition of the paste is disclosed in Korean Patent Laid-open Publication No. 2003-003751.

The sintering inhibitor refers to a component having the same or similar composition and properties as or to those of the dielectric composition in order to prevent cracks from occurring due to difference in shrinkage rate between ceramic and metal. According to the invention, the sintering inhibitor is preferably the same as the main component of the dielectric composition. In other words, the sintering inhibitor is ceramic powders of $(Ca_{1-x}Sr_x)(Zr_{1-y}Ti_y)O_3$, where R represents one element selected from Mg and Sr, and x and y satisfy the conditions of $0 \leq x \leq 0.1$ and $0 \leq y \leq 0.1$.

As described above, the binder is the cellulose-based binder, and most preferably, an ethyl cellulose-based binder. The paste of the external electrodes preferably has a viscosity of 15,000~40,000 cps (10 rpm).

Next, after a bake-out process by plasticizing the external electrodes and the stacked body of the dielectrics with the internal electrodes printed thereon, sintering is performed.

Plasticizing is performed under reducing atmosphere at a plasticizing temperature of 200~600° C., and preferably of 230~350° C. Plasticizing time is 5 hours or more, preferably 5~40 hours, and more preferably 20~40 hours. In order to prevent oxidation of the internal and external electrodes, plasticizing is preferably performed under reducing atmosphere, and more preferably under nitrogen atmosphere.

Sintering is also performed under reducing atmosphere at a sintering temperature of 870~1,000° C., and preferably of 900~970° C. Sintering time is 5 hours or more, preferably 5~20 fours, and more preferably 9~12 hours.

After the sintering process, Ni plating and Sn/Pb plating are sequentially performed.

The present invention will be described in detail with reference to examples.

EXAMPLE 1

(1-1) Manufacturing of Glass Frit

After being provided with a raw material produced by weighing respective components and uniformly mixing the same so as to satisfy the composition of the following Table 1, a platinum crucible was loaded into a heat treatment furnace. Then, the raw material was melted by heating the crucible to a temperature of 1,350° C. at a heating rate of 10 K/min, and maintaining the same for 1 hour. The melt is rapidly cooled through twin rollers, and is formed into glass flakes.

The glass flakes are formed into powders of 0.8~1.0 μm by dry grinding or wet grinding.

(1-2) Property Evaluation of Glass Frit

The softening temperature of the produced glass frit was measured at a temperature increasing rate of 10 k/min in atmosphere by use of a softening point tester (Lavino Ts Tester, Orton, TSM03, USA). Measurement results were obtained as shown in the following Table 1.

(1-3) Structural Analysis of Glass Frit

Figure 2:
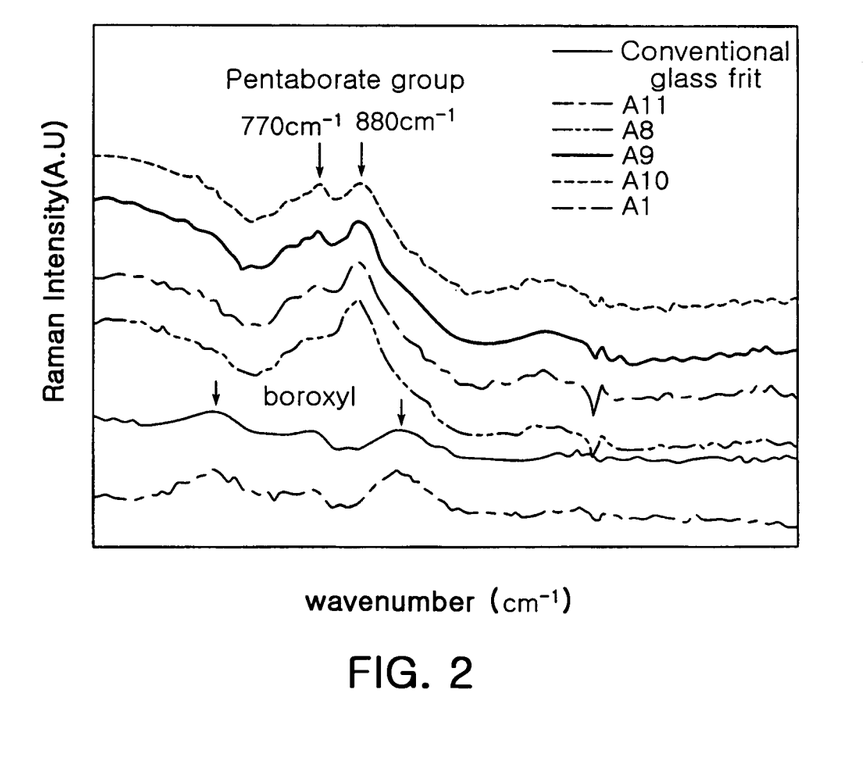
FIG. 2 is a graph illustrating a result of structural analysis of the lithium borosilicate glass.

Structural analysis of the glass frit was performed using FT-Raman (Fourier Transform Raman, RFS-100/S, Germany), and results of the structural analysis are shown in FIG. 2. Additionally, the ratio of tetracoordinate boron (BO4) to tricoordinate boron (BO3) was detected using B Solid-NMR (Solid/Micro-Imaging High Resolution NMR, Bruker, AVANCE 400 WB, DSX-400, Germany), and the results shown in FIG. 3 were obtained.

(1-4) Production of Dielectric Slurries $Ca(Ti_{0.03}Zr_{0.97})O_3$ powders were produced using $CaZrO_3$ and $CaTiO_3$ which are produced by a hydrothermal process. Dielectric powders were prepared by mixing 100 parts by weight of $Ca(Ti_{0.03}Zr_{0.97})O_3$, 2 parts by weight of $MnO_2$, and 2 parts by weight of the glass frit produced by the above process. Dielectric powder slurries were prepared by mixing 100 parts by weight of the prepared dielectric powders, 10 parts by weight of organic binder (PVB resin), 40 parts by weight of plasticizer with respect to 100 parts by weight of the organic binder, and a solvent 8 times of the amount of the organic binder.

(1-5) Evaluation of Gelation of Dielectric Slurry

Figure 4:
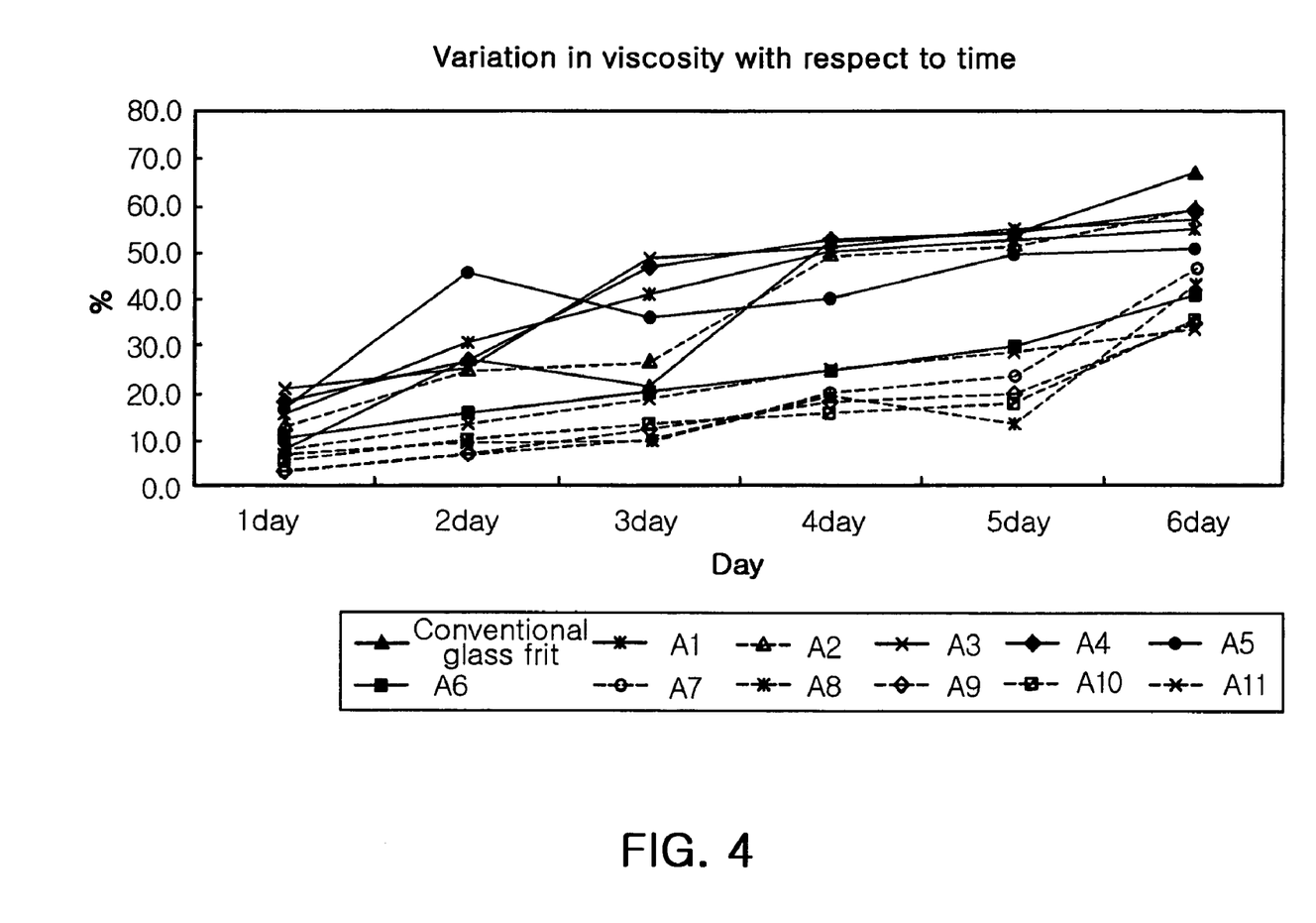
FIG. 4 is a graph illustrating variation in viscosity of dielectric slurries with respect to time at laboratory scale.
Figure 5:
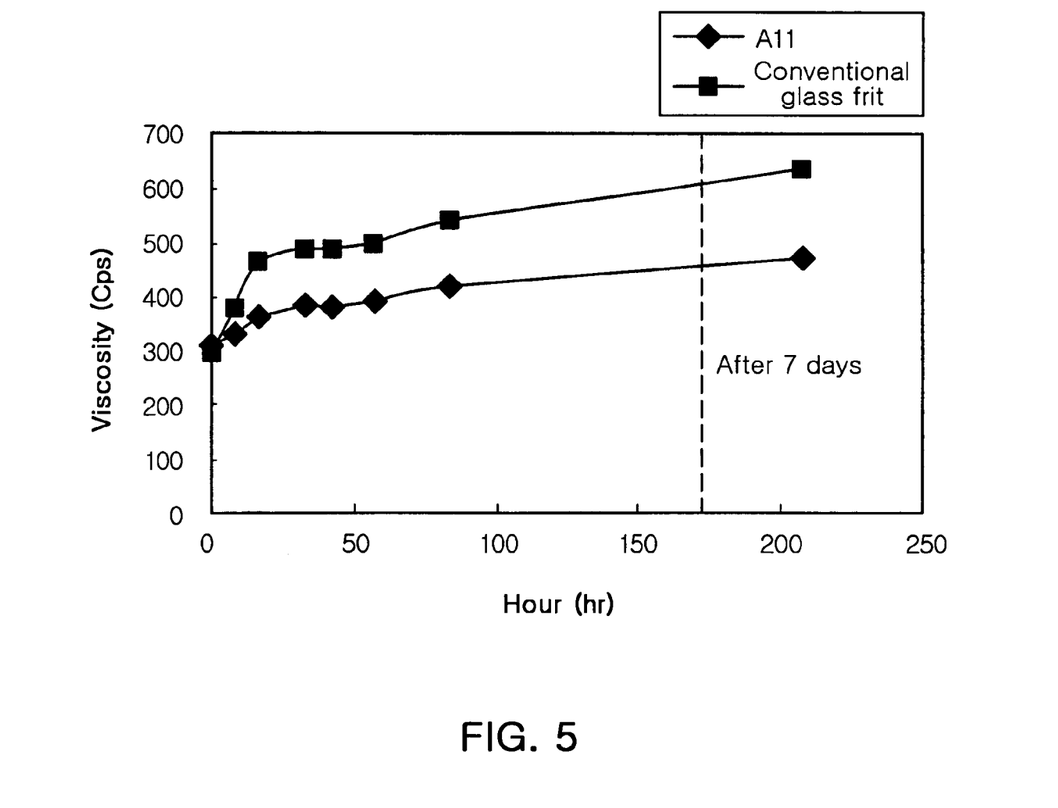
FIG. 5 is a graph illustrating variation in viscosity of dielectric slurries with respect to time at industrial scale.

Gelation of the dielectric slurries was evaluated, and results were obtained as shown in FIG. 4. In FIG. 4, variation in viscosity of the dielectric slurries with respect to time was measured at a rate of 100 rpm. In FIG. 5, the time variation in viscosity for the dielectric slurries comprising a conventional glass frit "CG" and a glass frit of A11 shown in Table 1 at industrial scale is shown.

In FIG. 2, results of structural analysis for the conventional glass frit CG, glass frits of A1, and A8~A11 performed using FT Raman are shown. In the conventional glass frit CG and the glass frit of A1, a boroxyl group consisting of tricoordinate boron is observed near a frequency of 500 $cm^{-1}$ and 980 $cm^{-1}$, and a small amount of pentaborate group is observed near a frequency of 770 $cm^{-1}$. On the other hand, in the glass frits of A8~A11, the main peak of the pentaborate group is observed near 770 $cm^{-1}$ and 880 $cm^{-1}$. This means that, as the ratio of boron to lithium is appropriately harmonized, the coordinate number of boron is changed from tricoordinate to tetracoordinate.

Figure 3:
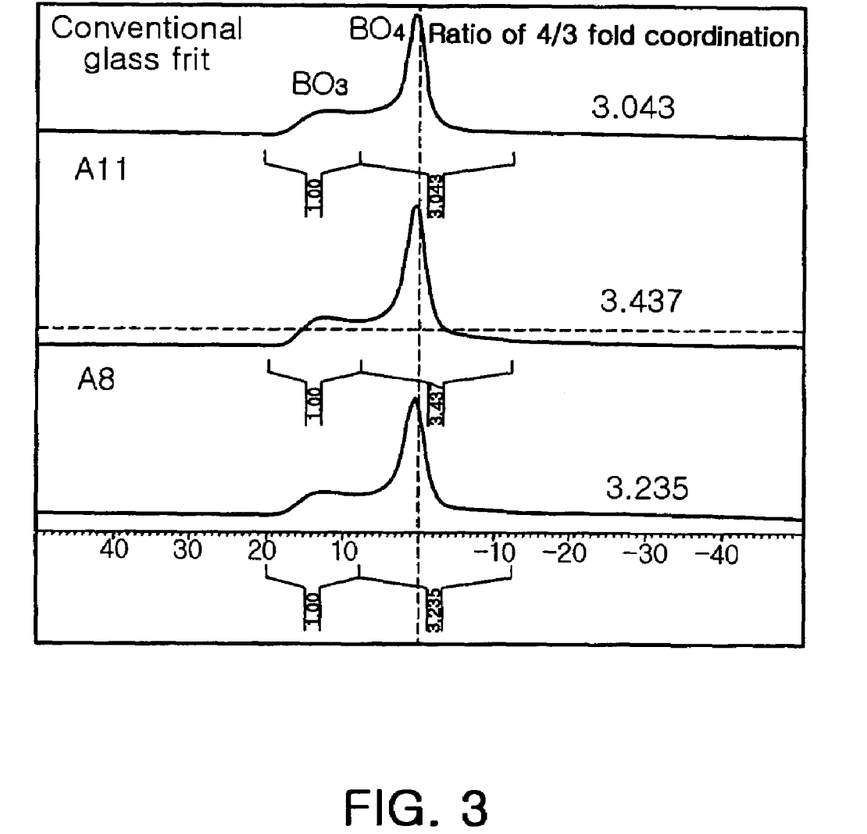
FIG. 3 is a graph illustrating the ratio of tetracoordinate boron to tricoordinate boron in the lithium borosilicate glass.

FIG. 3 shows quantitative analysis of the ratio of tetracoordinate boron to tricoordinate boron for the conventional glass frit CG, and the glass frits of A8 and A11. A tricoordinate boron BO3 peak is observed between 10~20 ppm, and a tetracoordinate boron BO4 peak is observed near 0 ppm. In particular, for the glass frit of A11, the ratio of tetracoordinate boron to tricoordinate boron is increased by 0.4 in comparison to that of the conventional glass frit.

In FIG. 4, gelation degrees of the dielectric slurries comprising the glass frits of Table 1 in a laboratory scale are shown. After 6 days, the viscosity of the dielectric slurries comprising the conventional glass frit is 60% or greater than the initial viscosity. On the other hand, for the dielectric slurries comprising the glass frits of A1~A11, the viscosity is increased within 60% of the initial viscosity after 6 days. In particular, for the glass frits of A6~A11, which have the $SiO_2$ content of 20~25 mol % while satisfying the ratio of $B_2O_3/Li_2O>0.9$, since the viscosity is increased within about 50% of the initial viscosity after 6 days, effect of preventing gelation was excellent.

FIG. 5 shows the variation in viscosity of dielectric slurries produced using the conventional glass CG and the Glass A11 at industrial scale with respect to time. For the dielectric slurry comprising the conventional glass frit CG, the viscosity is increased about 110% or more than the initial viscosity after 1 week. On the contrary, for the dielectric slurry comprising the glass frit of A11, the viscosity is increased about 50% or more than the initial viscosity after 1 week. That is, the glass frit of A11 exhibits effect of suppressing the viscosity increase rate 60% less than that of the conventional glass frit.

TABLE 1

| Composition (mol %) | CG | A1 | A2 | A3 | A4 | A5 | A6 | A7 | A8 | A9 | A10 | A11 |
|---|---|---|---|---|---|---|---|---|---|---|---|---|
| $SiO_2$ | 28 | 30 | 30 | 33 | 17 | 17 | 20 | 25 | 25 | 25 | 25 | 25 |
| $B_2O_3$ | 27 | 22 | 22 | 20 | 25 | 25 | 23 | 27 | 29 | 33 | 35 | 31 |
| $Li_2O$ | 30 | 25 | 25 | 23 | 22 | 22 | 20 | 29 | 27 | 23 | 21 | 25 |
| $K_2O$ |  | 5 | 5 | 4 |  | 5 | 3 | 3 | 3 | 3 | 3 | 3 |
| CaO | 5 | 8 | 8 | 8 | 12 | 7 | 10 | 2 | 2 | 2 | 2 | 2 |
| $Al_2O_3$ | 10 | 10 | 10 | 10 | 5 | 5 | 5 | 2 | 2 | 2 | 2 | 2 |
| $TiO_2$ |  |  | 1 | 1 | 12 | 12 | 12 | 9 | 9 | 9 | 9 | 9 |
| $ZrO_2$ |  |  |  | 1 | 7 | 7 | 7 | 3 | 3 | 3 | 3 | 3 |
| $B_2O_3/Li_2O$ | 0.9 | 0.88 | 0.88 | 0.86 | 1.13 | 1.13 | 1.15 | 0.93 | 1.07 | 1.43 | 1.66 | 1.24 |
| Softening Temperature (° C.) | 550 | 543 |  |  |  |  |  | 555 | 564 | 571 | 560 | 561 |
| Glass Agglomeration | ≧6 μm | 3 μm | 3 μm | 2 μm | No | No | No | No | No | No | No | No |

EXAMPLE 2

Dielectric sheets were produced using the dielectric slurries of Example 1 through a Doctor Blade process, and Cu internal electrodes were printed thereon. After the dielectric sheets having the internal electrodes printed thereon were stacked to five layers, the dielectric sheets were compressed at 1,000 kg/mm$^2$, and were then cut to a stacked body. Before plasticizing and sintering the stacked body, paste of external electrodes shown in Table 2 was applied to opposite ends of the stacked body, and was then sintered together with the stacked body. That is, under nitrogen atmosphere, plasticizing was performed for 25 hours at 300° C., and sintering is performed for 10 hours at 950° C. Paste of external electrodes comprises 59 wt % of Cu, 11.8 wt % of $Ca(Ti_{0.03}Zr_{0.97})O_3$ powders, 3.54 wt % of ethyl cellulose binder, and the balance of solvent.

Agglomeration of the glass on the surface of dielectric layers of the sintered multilayer ceramic capacitor was detected with the naked eye, and, for samples with the glass agglomerated thereon, average sizes of the agglomerated glass were measured. Results were obtained as shown in Table 2. For convenience of description, the compositions of the glasses in Table 1 are also used in Table 2.

Figure 6:
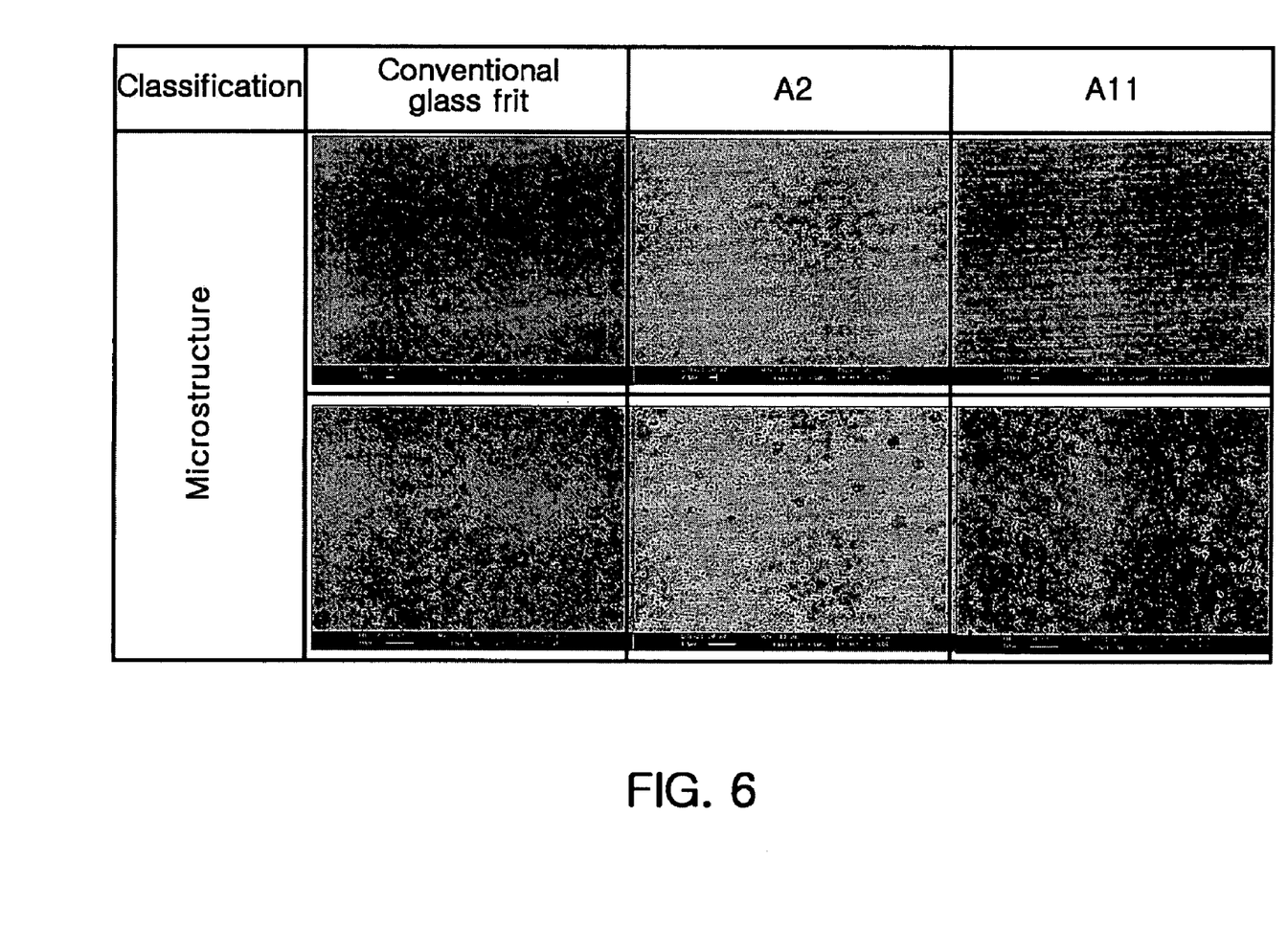
FIG. 6 is micrographs of microstructures of sintered samples.

In FIG. 6, microstructures of sintered samples produced using the conventional glass, and the glass frits of A2 and A11 among the samples of Table 1 are shown. The microstructures of the sintered samples were detected using an SEM (Scanning Electron Microscope, S-3000N, Hitachi, Japan).

For glass frits of A4 and A5, although the agglomeration of the glass did not occur, a great number of pores were created in microstructures of the sintered samples. Although the glass frits of A4 and A5 had a ratio of $B_2O_3/Li_2O$ of 1 or more, since they had an insufficient solubility of the dielectrics due to an insufficient amount of $SiO_2$, they were incompletely sintered. As a result, they did not have a dense microstructure.

For glass frits of A7~A11, the ratio of $B_2O_3/Li_2O$ exceeds 0.9, and the agglomeration of the glass was completely prevented. The glass frits of A7~A11 also had dense microstructures, respectively.

After applying In—Ga electrodes to the sintered samples produced using the conventional glass frit CG and the glass frit of A11, permittivity K and quality factor Q were measured using a Capacitance Meter (Agilent, 4278A), and insulating resistance IR and specific resistance R were measured using a High Resistance Meter (Agilent, 4339A). Results were obtained as shown in Table 3. For the sample using the glass frit of A11, 0.5 parts by weight of $ZrSiO_4$ was added as filler to the dielectric slurry with respect to 100 parts by weight of main component.

TABLE 3

| Sample | Capacitance (μF) | Quality factor (Q) | Permittivity (K) | IR(Ω) | Density (cm$^3$/g) |
|---|---|---|---|---|---|
| CG | 35.01 | 2597 | 27.79 | $1.5 \times 10^{12}$ | 4.27 |
| A11 | 35.66 | 2406 | 28.69 | $2.8 \times 10^{12}$ | 4.34 |

TABLE 2

| Composition (mol %) | CG | A1 | A2 | A3 | A4 | A5 | A6 | A7 | A8 | A9 | A10 | A11 |
|---|---|---|---|---|---|---|---|---|---|---|---|---|
| SiO$_2$ | 28 | 30 | 30 | 33 | 17 | 17 | 20 | 25 | 25 | 25 | 25 | 25 |
| B$_2$O$_3$ | 27 | 22 | 22 | 20 | 25 | 25 | 23 | 27 | 29 | 33 | 35 | 31 |
| Li$_2$O | 30 | 25 | 25 | 23 | 22 | 22 | 20 | 29 | 27 | 23 | 21 | 25 |
| K$_2$O |  | 5 | 5 | 4 |  | 5 | 3 | 3 | 3 | 3 | 3 | 3 |
| CaO | 5 | 8 | 8 | 8 | 12 | 7 | 10 | 2 | 2 | 2 | 2 | 2 |
| Al$_2$O$_3$ | 10 | 10 | 10 | 10 | 5 | 5 | 5 | 2 | 2 | 2 | 2 | 2 |
| TiO$_2$ |  |  | 1 | 1 | 12 | 12 | 12 | 9 | 9 | 9 | 9 | 9 |
| ZrO$_2$ |  |  |  | 1 | 7 | 7 | 7 | 3 | 3 | 3 | 3 | 3 |
| B$_2$O$_3$/Li$_2$O | 0.9 | 0.88 | 0.88 | 0.86 | 1.13 | 1.13 | 1.15 | 0.93 | 1.07 | 1.43 | 1.66 | 1.24 |
| Softening Temperature (° C.) | 550 | 543 |  |  |  |  |  | 555 | 564 | 571 | 560 | 561 |
| Glass agglomeration | ≧6 μm | 3 μm | 3 μm | 2 μm | No | No | No | No | No | No | No | No |

With the conventional glass frit CG, agglomeration of the glass occurred on the surface of the dielectric layer, and the size of the agglomerated glass was 6 μm or more.

With the glass frits of A1~A3, the size of the agglomerated glass is reduced. From Table 2, it can be seen that although the glass frits of A1~A3 have a lower ratio of $B_2O_3/Li_2O$ than that of the conventional glass frit CG, the agglomeration of the glass is reduced since they have a lower content of $B_2O_3+Li_2O$ than that of the conventional glass frit CG. When minimizing the content of $B_2O_3+Li_2O$, the agglomeration of the glass can be prevented. However, a significantly lower content of $B_2O_3+Li_2O$ makes it difficult to perform low temperature sintering. Accordingly, instead of lowering the content of $B_2O_3+Li_2O$, it is desirable to prevent the agglomeration of the glass by controlling the ratio of $B_2O_3/Li_2O$.

As shown in Table 3, the sample using the glass frit of A11 exhibits approximately identical electrical properties to those of the conventional glass frit CG. Meanwhile, since $ZrSiO_4$ added to the dielectric layers acts to fill the pores therein during sintering, it can be observed that the density is slightly increased.

Figure 7:
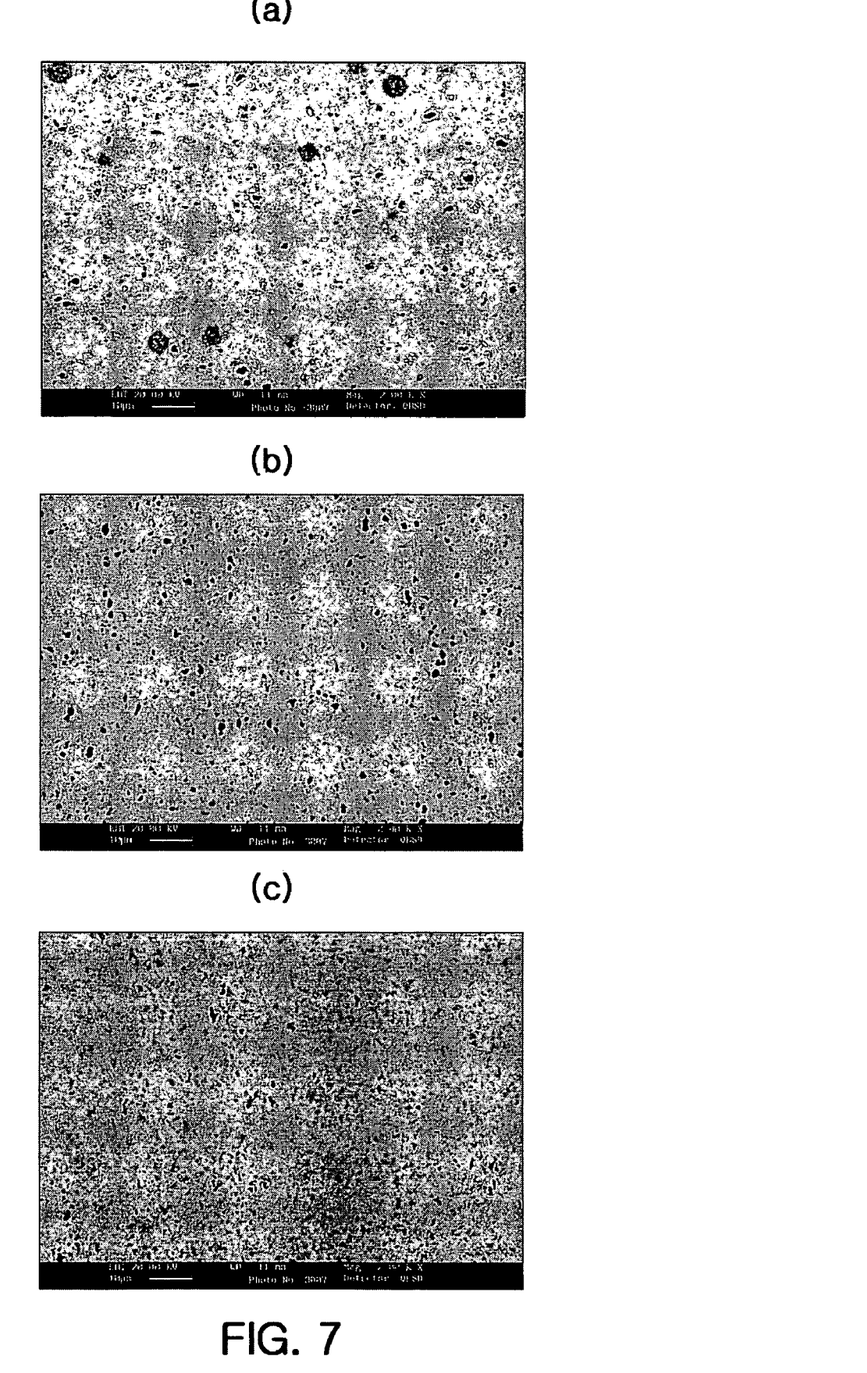

FIGS. 7a to 7c show microstructures of the samples produced using the conventional glass frit CG, the glass frit of A11, and the glass frit of A11 and fillers, respectively. It can be seen from the drawings that in comparison to the filler-less sample as shown in FIG. 7b, the sample shown in FIG. 7c has a denser microstructure.

EXAMPLE 3

Acid resistance was evaluated for sintered samples produced using the conventional glass frit CG and the glass frit of A11. The acid resistance was evaluated for Ni and Sn plating solutions. Evaluation results were obtained as shown in FIG. 8 (Ni plating solution) and FIG. 9 (Sn plating solution).

Figure 8:
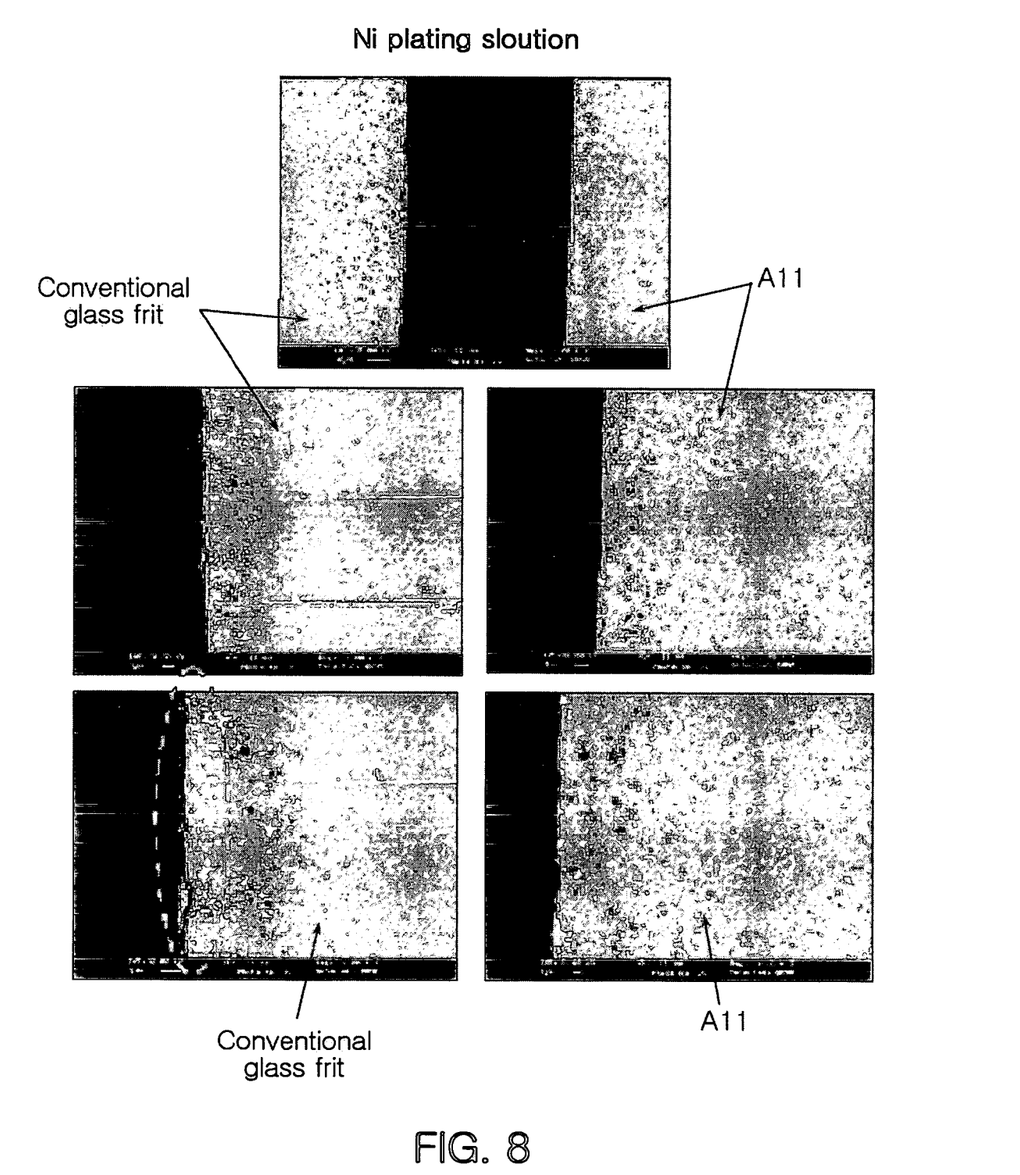
FIG. 8 is micrographs of the sintered sample after testing acid resistance using a Ni plating solution.
Figure 9:
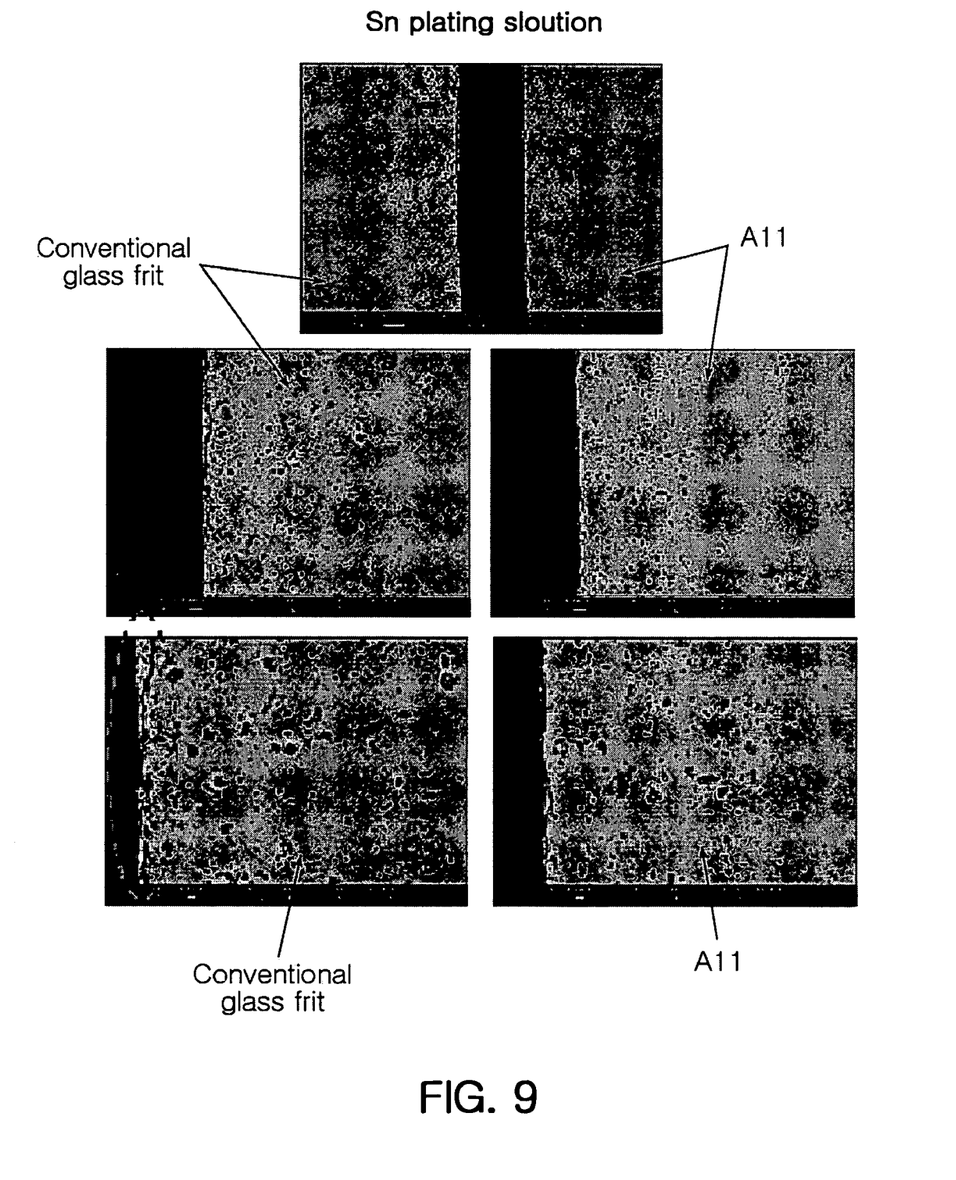
FIG. 9 is micrographs of the sintered sample after testing acid resistance using a Sn plating solution.

As shown in FIGS. 8 and 9, the samples produced using the conventional glass frit CG are eroded more deeply, and have a visible infiltration path of the plating solvent. However, the samples using the glass frit of A11 do not have the visible infiltration path of the plating solvent.

As apparent from the above description, the present invention provides a glass frit for dielectrics which can prevent gelation of dielectric slurries, minimize or prevent agglomeration of glass on the surface of the dielectric layer, and provide excellent acid resistance.

It should be understood that the embodiments and the accompanying drawings have been described for illustrative purposes and the present invention is limited only by the following claims. Further, those skilled in the art will appreciate that various modifications, additions and substitutions are allowed without departing from the scope and spirit of the invention as set forth in the accompanying claims. For example, although the embodiments have been described as comprising $Ca(Zr_{1-y}Ti_y)O_3$ for the main component of the dielectric ceramic, the present invention is not limited to this, and thus other ceramic powders may be used.

What is claimed is:

1. A dielectric glass frit for dielectrics, having: a composition represented by the formula $aSiO_2$-$bB_2O_3$-$cLi_2O$-$dK_2O$-$eCaO$-$fAl_2O_3$-$gTiO_2$-$hZrO_2$, wherein the ratio of components satisfies the conditions of $20 \leq a \leq 35$, $20 \leq b \leq 35$, $20 \leq c \leq 30$, $3 \leq d \leq 5$, $2 \leq e \leq 12$, $2 \leq f \leq 10$, $1 \leq g \leq 12$ and $1 \leq h \leq 7$ in terms of mol % where $a+b+c+d+e+f+g+h=100$.

2. The glass frit as set forth in claim 1, wherein the content of $SiO_2$ satisfies the condition of $20 \leq a \leq 25$ and the ratio of $B_2O_3$ to $Li_2O$ satisfies the condition of $b/c > 0.9$.

3. The glass frit as set forth in claim 1, wherein the content of $SiO_2$ satisfies the condition of $20 \leq a \leq 25$ and the ratio of $B_2O_3$ to $Li_2O$ satisfies the condition of $0.93 \leq b/c \leq 1.66$.

4. The glass frit as set forth in claim 1, wherein the content of $SiO_2$ satisfies the condition of $25 < a \leq 35$ and the ratio of $B_2O_3$ to $Li_2O$ satisfies the condition of $b/c < 0.9$.

5. The glass frit as set forth in claim 1, wherein the content of $SiO_2$ satisfies the condition of $25 < a \leq 35$ and the ratio of $B_2O_3$ to $Li_2O$ satisfies the condition of $0.86 \leq b/c \leq 0.88$.

6. The glass frit as set forth in claim 1, wherein the ratio of tetracoordinate boron (BO4) to tricoordinate boron (BO3) in the glass frit is between 3.235 and 3.437.

7. A dielectric ceramic composition, comprising:
100 parts by weight of $(Ca_{1-x}R_x)(Zr_{1-y}Ti_y)O_3$ ($0 \leq x \leq 0.1$ and $0 \leq y \leq 0.1$) as a main component;
0.5~2.5 parts by weight of glass frit having a composition represented by the formula $aSiO_2$-$bB_2O_3$-$cLi_2O$-$dK_2O$-$eCaO$-$fAl_2O_3$-$gTiO_2$-$hZrO_2$; and
1.0~5.0 parts by weight of a Mn compound,
wherein R represents one element selected from Mg and Sr, and the ratio of components of the glass frit satisfies the conditions of $20 \leq a \leq 35$, $20 \leq b \leq 35$, $20 \leq c \leq 30$, $3 \leq d \leq 5$, $2 \leq e \leq 12$, $2 \leq f \leq 10$, $1 \leq g \leq 12$ and $1 \leq h \leq 7$ in terms of mol % where $a+b+c+d+e+f+g+h=100$.

8. The dielectric ceramic composition as set forth in claim 7, wherein the content of $SiO_2$ satisfies the condition of $20 \leq a \leq 25$ and the ratio of $B_2O_3$ to $Li_2O$ satisfies the condition of $b/c > 0.9$.

9. The dielectric ceramic composition as set forth in claim 7, wherein the content of $SiO_2$ satisfies the condition of $20 \leq a \leq 25$ and the ratio of $B_2O_3$ to $Li_2O$ satisfies the condition of $0.93 \leq b/c \leq 1.66$.

10. The dielectric ceramic composition as set forth in claim 7, wherein the content of $SiO_2$ satisfies the condition of $25 < a \leq 35$ and the ratio of $B_2O_3$ to $Li_2O$ satisfies the condition of $b/c < 0.9$.

11. The dielectric ceramic composition as set forth in claim 7, wherein the content of $SiO_2$ satisfies the condition of $25 < a \leq 35$ and the ratio of $B_2O_3$ to $Li_2O$ satisfies the condition of $0.86 \leq b/c \leq 0.88$.

12. The dielectric ceramic composition as set forth in claim 7, wherein the ratio of tetracoordinate boron (BO4) to tricoordinate boron (BO3) in the glass frit is between 3.235 and 3.437.

13. The dielectric ceramic composition as set forth in claim 7, wherein the main component is $Ca(Zr_{1-y}Ti_y)O_3$.

14. The dielectric ceramic composition as set forth in claim 7, further comprising:
0.2~1.0 part by weight of at least one filler selected from the group consisting of $ZrSiO_4$, $SiO_2$, $ZrO_2$, and $Al_2O_3$.

15. A multilayer ceramic capacitor, comprising:
a plurality of dielectric ceramic layers;
Cu internal electrodes formed between the plurality of dielectric ceramic layers, each of the dielectric ceramic layers comprising 100 parts by weight of $(Ca_{1-x}Sr_x)(Zr_{1-y}Ti_y)O_3$ ($0 \leq x \leq 0.1$ and $0 \leq y \leq 0.1$) as a main component, 0.5~2.5 parts by weight of glass having a composition represented by the formula $aSiO_2$-$bB_2O_3$-$cLi_2O$-$dK_2O$-$eCaO$-$fAl_2O_3$-$gTiO_2$-$hZrO_2$, and 1.0~5.0 parts by weight of a Mn compound, wherein R represents one element selected from Mg and Sr, and the ratio of components of the glass frit satisfies the conditions of $20 \leq a \leq 35$, $20 \leq b \leq 35$, $20 \leq c \leq 30$, $3 \leq d \leq 5$, $2 \leq e \leq 12$, $2 \leq f \leq 10$, $1 \leq g \leq 12$ and $1 \leq h \leq 7$ in terms of mol % where $a+b+c+d+e+f+g+h=100$; and
Cu external electrodes formed at opposite ends of a stacked body so as to be electrically connected to the internal electrodes.

16. The capacitor as set forth in claim 15, wherein the content of $SiO_2$ satisfies the condition of $20 \leq a \leq 25$ and the ratio of $B_2O_3$ to $Li_2O$ satisfies the condition of $b/c > 0.9$.

17. The capacitor as set forth in claim 15, wherein the content of $SiO_2$ satisfies the condition of $20 \leq a \leq 25$ and the ratio of $B_2O_3$ to $Li_2O$ satisfies the condition of $0.93 \leq b/c \leq 1.66$.

18. The capacitor as set forth in claim 15, wherein the content of $SiO_2$ satisfies the condition of $25 < a \leq 35$ and the ratio of $B_2O_3$ to $Li_2O$ satisfies the condition of $b/c < 0.9$.

19. The capacitor as set forth in claim 15, wherein the content of $SiO_2$ satisfies the condition of $25 < a \leq 35$ and the ratio of $B_2O_3$ to $Li_2O$ satisfies the condition of $0.86 \leq b/c \leq 0.88$.

20. The capacitor as set forth in claim 15, wherein the ratio of tetracoordinate boron (BO4) to tricoordinate boron (BO3) in the glass frit is between 3.235 and 3.437.

21. The capacitor as set forth in claim 15, wherein the main component is $Ca(Zr_{1-y}Ti_y)O_3$.

22. The capacitor as set forth in claim 15, wherein the dielectric ceramic composition further comprises 0.2~1.0 part by weight of at least one filler selected from the group consisting of $ZrSiO_4$, $SiO_2$, $ZrO_2$, and $Al_2O_3$.

23. The capacitor as set forth in claim 15, wherein agglomeration of the glass on the surface of the dielectric layers is not present.

24. The capacitor as set forth in claim 15, wherein the external electrodes have a thickness of 20~30 μm.

25. A method for manufacturing a multilayer ceramic capacitor, comprising the steps of:
forming Cu internal electrodes on surfaces of dielectric sheets formed of the dielectric ceramic composition according to claim 7;
forming a stacked body by laminating, compressing and cutting the dielectric sheets having the Cu internal electrodes formed therein;
applying paste for Cu external electrodes on opposite ends of the stacked body such that the Cu external electrodes are electrically connected to the Cu internal electrodes; and
simultaneously sintering the stacked body and the Cu external electrodes formed thereon.

26. The method as set forth in claim 25, wherein the content of $SiO_2$ satisfies the condition of $20 \leqq a \leqq 25$ and the ratio of $B_2O_3$ to $Li_2O$ satisfies the condition of $b/c > 0.9$.

27. The method as set forth in claim 25, wherein the content of $SiO_2$ satisfies the condition of $20 \leqq a \leqq 25$ and the ratio of $B_2O_3$ to $Li_2O$ satisfies the condition of $0.93 \leqq b/c \leqq 1.66$.

28. The method as set forth in claim 25, wherein the content of $SiO_2$ satisfies the condition of $25 < a \leqq 35$ and the ratio of $B_2O_3$ to $Li_2O$ satisfies the condition of $b/c < 0.9$.

29. The method as set forth in claim 25, wherein the content of $SiO_2$ satisfies the condition of $25 < a \leqq 35$ and the ratio of $B_2O_3$ to $Li_2O$ satisfies the condition of $0.86 \leqq b/c \leqq 0.88$.

30. The method as set forth in claim 25, wherein the ratio of tetracoordinate boron (BO4) to tricoordinate boron (BO3) in the glass frit is between 3.235 and 3.437.

31. The method as set forth in claim 25, wherein the main component is $Ca(Zr_{1-y}Ti_y)O_3$.

32. The method as set forth in claim 25, wherein the dielectric ceramic composition further comprises 0.2~1.0 part by weight of at least one filler selected from the group consisting of $ZrSiO_4$, $SiO_2$, $ZrO_2$, and $Al_2O_3$ for 100 parts by weight of a main component.

33. The method as set forth in claim 25, wherein the paste of the Cu external electrodes comprises: 40~70 wt % of Cu metal; 5~20 wt % of ceramic powders of $(Ca_{1-x}R_x)(Zr_{1-y}Ti_y)O_3$ ($0 \leqq x \leqq 0.1$ and $0 \leqq y \leqq 0.1$ where R represents one element selected from Mg and Sr; 1.6~5.6 wt % of a binder; and the balance of a solvent.

34. The method as set forth in claim 25, wherein simultaneous sintering comprises plasticizing the sintered body and the external electrodes for 5~40 hours at 200~600° C., and sintering the same for 9~12 hours at 900~970° C.

* * * * *